US 6,678,711 B1

(12) United States Patent
Kalari

(10) Patent No.: US 6,678,711 B1
(45) Date of Patent: Jan. 13, 2004

(54) INCREMENTER/DECREMENTER CIRCUIT

(75) Inventor: Subba Rao Kalari, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 544 days.

(21) Appl. No.: 09/665,924

(22) Filed: Sep. 20, 2000

(51) Int. Cl.$^7$ .............................................. G06F 7/50
(52) U.S. Cl. ..................................................... 708/672
(58) Field of Search ................................ 708/700–714, 708/672, 670

(56) References Cited

U.S. PATENT DOCUMENTS

| | | | | |
|---|---|---|---|---|
| 4,280,190 A | * | 7/1981 | Smith ........................... | 708/672 |
| 4,486,851 A | * | 12/1984 | Christopher et al. ......... | 708/672 |
| 5,027,310 A | * | 6/1991 | Dalrymple .................... | 708/672 |
| 5,835,394 A | * | 11/1998 | Wong ........................... | 708/670 |
| 5,889,693 A | * | 3/1999 | Joshi et al. .................. | 708/672 |
| 6,516,335 B1 | * | 2/2003 | Martin et al. ................ | 708/672 |

OTHER PUBLICATIONS

Reza Hashemina, Highly Parallel Increment/Decrement using CMOS technology, 1991, IEEE, pp. 866–869.*
Reza Hashemina, A New Parallel Technigue for Design of Decrement/Decrement and Two's Complement Circuits, 1992, IEEE, pp. 887–890.*

* cited by examiner

Primary Examiner—Chuong Dinh Ngo
Assistant Examiner—Chat C. Do
(74) Attorney, Agent, or Firm—Mitchell, Silberberg & Knupp, LLP

(57) ABSTRACT

Provided is an incrementing/decrementing apparatus that includes an adder having a first input and a second input, each of the first input and the second input comprising multiple bits. A first multi-bit signal is connected to the first input, and a second multi-bit signal is connected to the second input, the second multi-bit signal including multiple bits. The adder increments the first multi-bit signal by a quantity when an increment/decrement signal has a first value and decrements the first multi-bit signal by the quantity when the increment/decrement signal has a second value. The multiple bits of the second multi-bit signal include at least one bit based solely on a corresponding bit in the quantity and at least one bit based solely on a value of the increment/decrement signal.

18 Claims, 3 Drawing Sheets

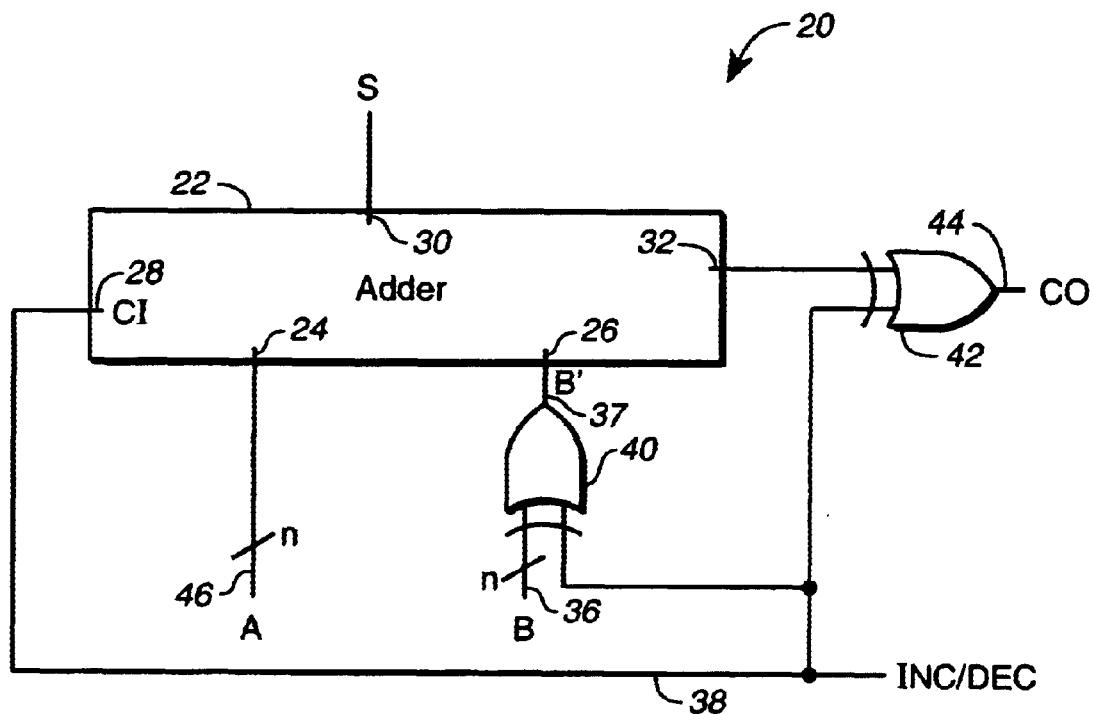
FIG._1
*(PRIOR ART)*
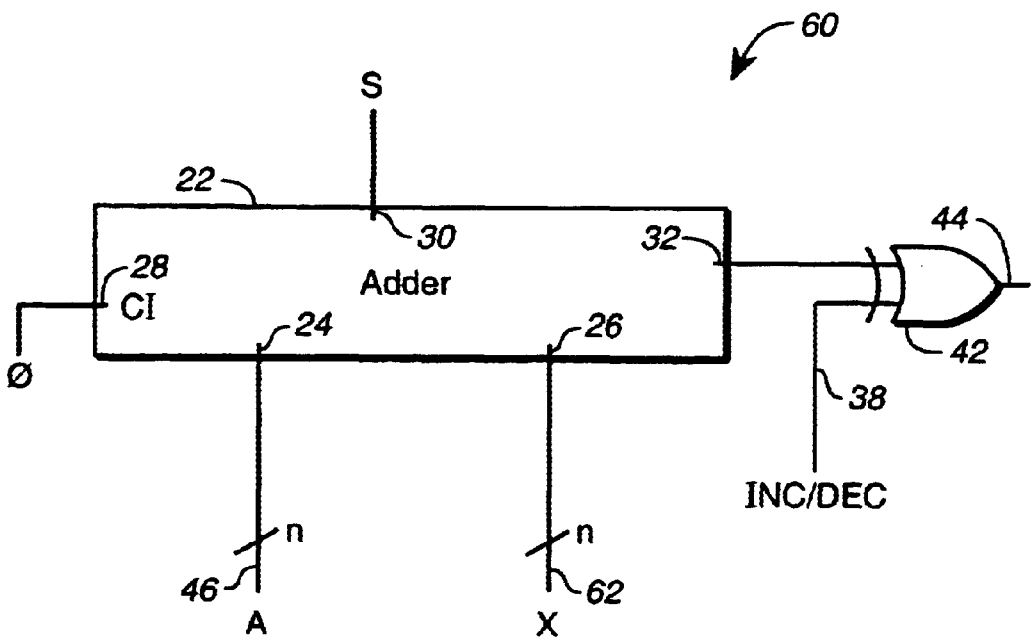
FIG._2

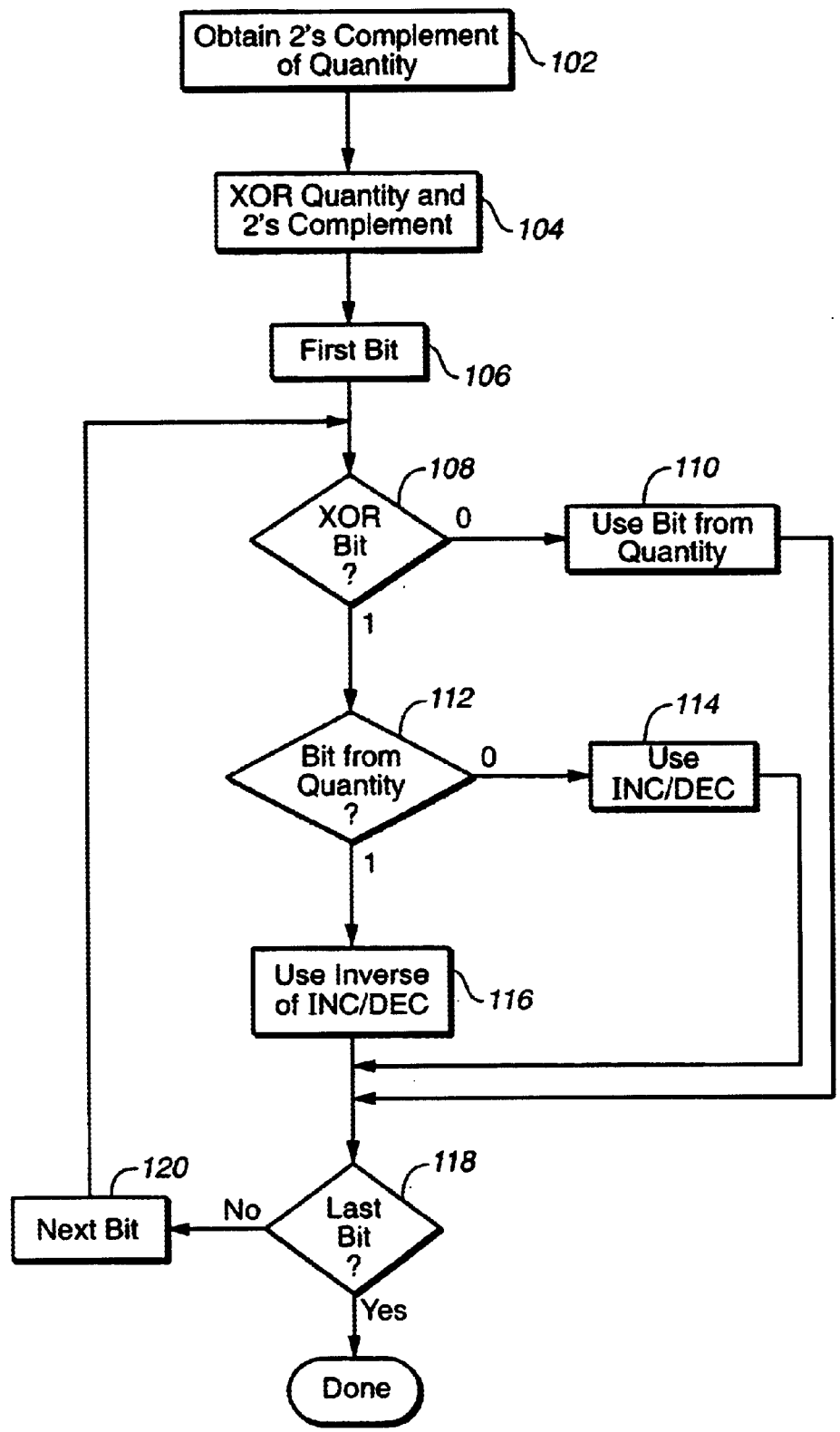
FIG._3

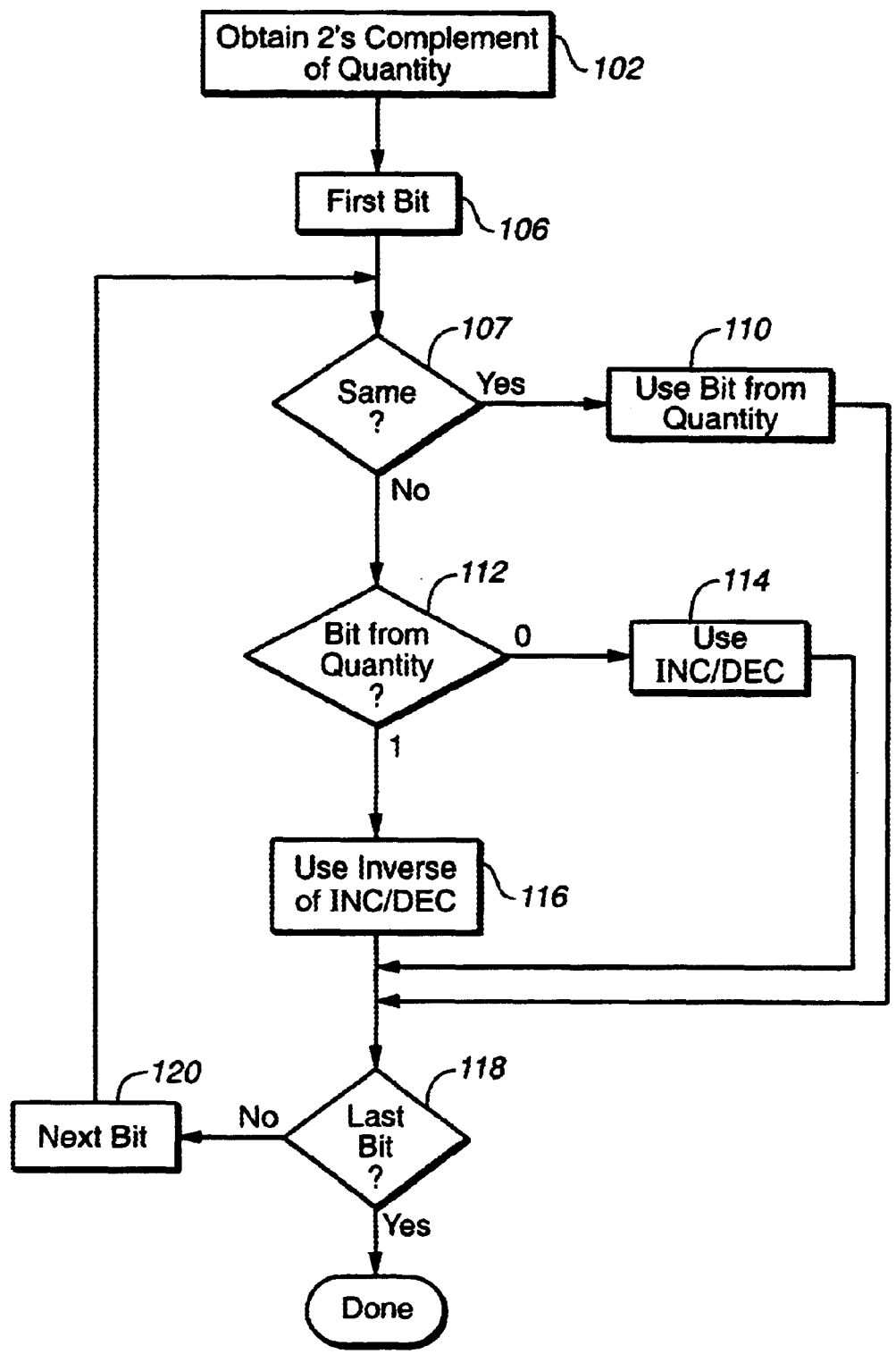
FIG._4

INCREMENTER/DECREMENTER CIRCUIT

BACKGROUND OF THE INVENTION

1. Field of the Invention

The present invention generally concerns a circuit for incrementing or decrementing a first input quantity by a second input quantity, depending upon the value of an increment/decrement input signal.

2. Description of the Related Art

An incrementer/decrementer circuit conventionally is used to increment or decrement a first input quantity by a second input quantity, with an increment/decrement signal determining whether the second input quantity is added to or subtracted from the first input quantity. Conventionally, an incrementer/decrementer circuit is implemented using an adder and a combination of gates. For example, a common conventional incrementer/decrementer circuit is illustrated in FIG. 1.

As shown in FIG. 1, incrementer/decrementer circuit 20 includes an adder 22. Adder 22 has the following inputs: a n-bit first input 24, a n-bit second input 26, and a 1-bit carry-in input 28. Adder 22 also includes n-bit summation output 30 and a 1-bit carry-out output 32. Not shown in FIG. 1 is a clock signal input which signals when the addition is to take place. Upon input of the appropriate clock signal, adder 22 adds the n-bit signal at input 24 to the n-bit signal at input 26 and the 1-bit carry-in signal at input 28, with the 1-bit carry-in signal corresponding to the least significant bit of the addition. The results of this addition are output as n-bit output signal 30 and a 1-bit carry-out signal 32. Typically, n will be 4, 8,16 or 32, but can be any whole number.

To convert adder 22 into an incrementer/decrementer circuit, it is common to combine the increment/decrement quantity 36 with an increment/decrement signal using a number of gates prior to inputting that signal into input 26. Thus, as shown in FIG. 1, each bit of the n-bit increment/decrement quantity 36 is combined with a 1-bit increment/decrement signal 38 in plural exclusive-or gates 40. Although only a single exclusive-or gate 40 is shown in FIG. 1, it should be understood that this is done for simplicity of illustration only and that the notation in FIG. 1 should be understood to indicate that a separate exclusive-or gate is used for each bit of the n-bit quantity 36. That is, each bit of quantity 36 is combined with the one-bit increment/decrement signal 38 is a separate exclusive-or gate 40. The resulting bits 37 are then supplied to input 26 of adder 22. Thus, n separate exclusive-or gates must be provided and the increment/decrement signal 38 must be capable of driving all n of such exclusive-or gates. As shown in FIG. 1, increment/decrement signal 38 also is supplied to carry-in input 28. Finally, increment/decrement signal 38 also is combined with carry-out signal 32 in exclusive-or gate 42 to produce the true carry-out signal 44.

It is initially noted that in the configuration shown in FIG. 1, when the increment/decrement signal 38 is set to zero, the quantity 36 is added to quantity 46 and when increment/decrement signal 38 is set to one, quantity 36 is subtracted from quantity 46. Thus, combining an input bit with the increment/decrement signal 38 in an exclusive-or gate 40 results in the input bit passing through unchanged in the event that increment has been selected and results in an inversion of the input bit when decrement has been selected. Therefore, the quantity 37 which is provided to input 26 is identical to quantity 36 when "increment" has been selected and is the inversion of quantity 36 when "decrement" has been selected. When "increment" has been selected, quantity 36 is therefore added directly to quantity 46, the carry-in bit provided to input 28 is zero, and the carry-out bit signal 44 is identical to the carry-out signal 32. Thus, in this situation increment/decrement circuit 20 functions exactly as adder 22 with no carry-in signal.

On the other hand, when the increment/decrement signal 38 is set to one, quantity 37, which is then the inversion of quantity 36, is added to a carry-in bit of one and to quantity 46. It can be shown that the result of this addition is the same as subtracting quantity 36 from quantity 46, except that the carry-out bit will be inverted. Therefore, in this case the increment/decrement signal 38 inverts the carry-out bit at output 32 to provide the correct carry-out bit at output 44.

While the increment/decrement circuit shown in FIG. 1 works for its intended purpose, the present inventor has discovered a more efficient way to implement an increment/decrement circuit.

SUMMARY OF THE INVENTION

In one aspect, the present invention is directed to an incrementing/decrementing apparatus that includes an adder having a first input and a second input, each of the first input and the second input comprising multiple bits. A first multi-bit signal is connected to the first input, and a second multi-bit signal is connected to the second input, the second multi-bit signal including multiple bits. The adder increments the first multi-bit signal by a quantity when an increment/decrement signal has a first value and decrements the first multi-bit signal by the quantity when the increment/decrement signal has a second value. The multiple bits of the second multi-bit signal include at least one bit based solely on a corresponding bit in the quantity and at least one bit based solely on a value of the increment/decrement signal.

As described in more detail below, by basing at least one bit of such multi-bit signal solely on a corresponding bit in the quantity and at least one bit solely on the increment/decrement signal, the present invention often can significantly reduce the number of gates required to implement the incrementer/decrementer circuit.

In a further aspect, the invention is directed to an incrementing/decrementing apparatus that includes an adder having a first input and a second input, each of the first input and the second input including multiple bits. A first multi-bit signal is connected to the first input, and a second multi-bit signal connected to the second input, the second multi-bit signal including multiple bits. The adder increments the first multi-bit signal by a quantity when an increment/decrement signal has a first value and decrements the first multi-bit signal by the quantity when the increment/decrement signal has a second value. The multiple bits of the second multi-bit signal have been specified by comparing bits of the quantity to corresponding bits of a two's complement of the quantity.

As described in more detail below, by specifying the bits of the second multi-bit signal in the foregoing manner, the present invention often can significantly reduce the number of gates required to implement the incrementer/decrementer circuit.

In a still further aspect, the invention is directed to determining bits for a multi-bit signal by obtaining a quantity that includes multiple bits and calculating a two's complement of the quantity. Then, each bit position of a multi-bit signal is assigned a value based on a comparison of a corresponding bit position in the quantity to the corresponding bit position in the two's complement of the quantity.

The foregoing summary is intended merely to provide a quick understanding of the general nature of the present invention. A more complete understanding of the invention can only be obtained by reference to the following detailed description of the preferred embodiments in connection with the accompanying drawings.

BRIEF DESCRIPTION OF THE DRAWINGS

FIG. 1 illustrates a conventional increment/decrement circuit.

FIG. 2 illustrates an increment/decrement circuit according to a representative embodiment of the invention.

FIG. 3 illustrates a flow diagram for identifying the bits of a second quantity corresponding to the increment/decrement quantity to be input into an adder in a representative embodiment of the invention.

FIG. 4 illustrates a flow diagram for a more generalized technique for identifying the bits of an increment/decrement quantity to be input into an adder according to a representative embodiment of the invention.

DETAILED DESCRIPTION OF THE PREFERRED EMBODIMENTS

FIG. 2 illustrates a representative incrementer/decrementer circuit 60 according to the present invention. As shown in FIG. 2, incrementer/decrementer circuit 60 also includes an adder 22 which is identical to adder 22 shown in FIG. 1. Also as in FIG. 1, a first quantity 46 is provided to input 24 of adder 22. However, a quantity 62 which is provided to input 26 is significantly different from the quantity 37 provided to input 26 in FIG. 1. In fact, quantity 62 generally can be provided by utilizing significantly less hardware than is required for conventional incrementer/decrementer circuits, such as incrementer/decrementer circuit 20 shown in FIG. 1. More specifically, as shown below, utilizing the configuration shown in FIG. 2, the bits of quantity 62 can be entirely comprised of: corresponding bits from the desired increment/decrement quantity, a one-bit increment/decrement signal, and/or the inverse of the one-bit increment/decrement signal.

A method for specifying the individual bits of quantity 62 will now be described with reference to the flow diagram shown in FIG. 3. Briefly, according to FIG. 3, the two's complement is obtained for the specified increment/decrement quantity; the increment/decrement quantity and its two's complement are exclusive-or'd on a bit-by-bit basis; then, looking bit-by-bit at the result of this exclusive-or operation, it can be determined whether each bit of quantity 62 should be either the corresponding bit of the increment/decrement quantity, the increment/decrement signal, or the inverse of the increment/decrement signal.

In more detail, in step 102, the two's complement of the increment/decrement quantity is obtained. For ease of comparison, it is assumed that the desired increment/decrement quantity is the same as that specified for the incrementer/decrementer circuit 20 shown in FIG. 1, i.e., quantity 36. The two's complement of quantity 36 can be determined by taking the inverse of each bit and adding one to the result. Thus, for example, if quantity 36 is the number "4" and the number of bits n for each of inputs 24 and 26 is four, quantity 36 in binary is specified as "0100". The two's complement of quantity 36 is then "1011" plus "0001", which equals "1100".

In step 104, the increment/decrement quantity 36 is exclusive-or'd with its two's complement on a bit-by-bit basis. Thus, for example, if the increment/decrement quantity is "0100" and its two's complement is "1100", then the result of this step is:

0100
1100
1000

In step 106, the process initializes to the first bit position. In this regard, it is noted that in this embodiment of the invention the bits may be examined in order from least significant to most significant, from most significant to least significant, or in any other order. This results from the fact that in this embodiment each bit is examined and identified independently of the others.

In step 108, a determination is made as to whether the current bit position of the result of step 104 is a zero or a one. If it is a zero, processing proceeds to step 110, otherwise processing proceeds step 112.

In step 110, the corresponding bit from the increment/decrement quantity 36 is utilized for the current bit position. For instance, continuing with the same example given above, if the current bit position is any of the three least significant bit positions, then the result of step 104 would have been zero and the process would have arrived at this step 110. Accordingly, the three least significant bits of quantity 62 in this example would be the same as the three least significant bits of quantity 36, i.e., "100".

In step 112, a determination is made as to whether the current bit position in the increment/decrement quantity 36 is a one or a zero. If it is a zero, processing proceeds to step 114. Otherwise, processing proceeds to step 116.

In step 114, the corresponding bit of quantity 62 is set to the increment/decrement signal 38. Continuing with the same example given above, because only the most significant bit position has an exclusive-or'd result (step 104) of "1" and an increment/decrement quantity 36 value of "0", that position would be the only one that would be set to the increment/decrement signal value 38 (i.e., "0" for incrementing or "1" for decrementing).

In step 116, the inverse of the increment/decrement 38 is used for the corresponding bit position of the input quantity 62. Again, continuing with the same example, there are no bit positions for which the result of the exclusive-or operation (step 104) is "1" and for which the increment/decrement quantity 36 is "1". Accordingly, none of the bits of quantity 62 in this particular example is set to the inverse of the increment/decrement signal 38 (i.e., "1" for incrementing or "0" for decrementing).

In step 118, a determination is made as to whether the current bit position is the last one. If so, processing is completed. If not, processing proceeds to step 120 to select the next bit position and then processing returns to step 108 to identify a value for quantity 62 at this bit position.

In the current example (i.e., increment/decrement quantity 36 equal to "0100"), the input quantity 62 can be provided using the increment/decrement signal 38 as the most significant bit and by using the three least significant bits of the input quantity 36 as the three least significant bits of input quantity 62. Because these signals are provided as inputs to the incrementer/decrementer circuit 60, they can be provided directly to input 26 of adder 22, with no additional gates required. This contrasts sharply with incrementer/decrementer circuit 20 shown in FIG. 1, in which four additional exclusive-or gates 40 would have been required.

By selecting the bits for quantity 62 utilizing the process illustrated in FIG. 3 and described above, the required hardware can almost always be significantly reduced. In particular, using this method, the most that ever will be required are: one or more bits from the input quantity 36, the increment/decrement signal 38, and the inverse of the increment/decrement signal 38. Because quantity 36 and increment/decrement signal 38 are provided as inputs to the increment/decrement circuit 60, typically the only additional hardware that might be required is an inverter to obtain the inverse of the increment/decrement signal 38.

The remainder of the increment/decrement circuit 60 is as shown in FIG. 2. Specifically, the increment/decrement signal 38 is exclusive-or'd with the carry-out signal 32 in exclusive-or gate 42 to provide a true carry-out bit 44. Also, the carry-in input 28 is tied to zero. In the increment/decrement circuit 20 shown in FIG. 1, the increment/decrement signal 38 must drive the carry-in input 28, gate 44 and n exclusive-or gates 40. This contrasts sharply with the increment/decrement circuit 60 shown in FIG. 2, in which in the example given above the increment/decrement signal 38 drives only a single gate 42 and one line of input 26. Moreover, as noted above, in the general case an increment/decrement circuit according to the present invention can be configured so that the required hardware is significantly reduced.

FIG. 4 illustrates a flow diagram for describing a more generalized technique to identify the bits of input quantity 62. Briefly, the technique illustrated in FIG. 4 is similar to that illustrated in FIG. 3, except that the increment/decrement quantity 36 and its two's complement are compared on a bit-by-bit basis in order to determine whether to use the corresponding increment/decrement quantity bit 36 or the increment/decrement signal 38 (or its inverse).

In more detail, in step 102 the two's complement of the increment/decrement quantity 36 is obtained, as described above.

In step 106 the process initializes to the first bit, as described above.

In step 107, the current bit position of the increment/decrement quantity 36 and its two's complement are compared. If those two bit positions are the same, then processing proceeds to step 110. Otherwise, processing proceeds to step 112. It is noted that the comparison between the same bit positions for these two different quantities can be compared in any manner known in the art. In the previous embodiment, this comparison was performed by utilizing the results of the exclusive-or operation performed in step 104. However, in this embodiment the comparison instead can be performed directly, can be performed by doing a separate exclusive-or operation for each bit in this step 107, or can be performed in any other manner known in the art.

Each of the other steps 110, 112, 114, 116, 118 and 120 is identical to the similarly numbered step described above in connection with the discussion of FIG. 3, and therefore is not described in detail here.

The steps of the above-described processes (i.e., FIGS. 3 and 4) can be implemented in software (such as in a general purpose computer executing computer-executable process steps stored on a computer-readable storage medium), in hardware (e.g., using a combination of gates or a programmable gate array), manually, or using any combination of such implementations. Preferably, the increment/decrement quantity 36 is fixed so that any of the bits of quantity 62 that are based on corresponding bits of quantity 36 can simply be tied to the appropriate "1" or "0" value. In this case, the steps described above can be performed in advance and the bits of input 26 can be tied either to such fixed values, to the increment/decrement signal 38, or to the inverse of the increment/decrement signal 30, as appropriate.

CONCLUSION

As noted above, the present invention provides an improved implementation of an incrementer/decrementer circuit. Specifically, the incrementer/decrementer circuit according to the present invention typically can be implemented with less hardware (e.g., fewer gates) and typically significantly reduces the load on the increment/decrement signal.

In the above embodiments, the incrementer/decrementer circuit was configured so that when the increment/decrement signal is zero a first quantity is incremented by the increment/decrement (second) quantity and when the increment/decrement signal is one the first quantity is decremented by the increment/decrement (second) quantity. However, this convention could be reversed in the above embodiments by simply replacing occurrences of the increment/decrement signal 38 with its inverse and replacing occurrences of its inverse with the increment/decrement signal. Similarly, it should be noted that although logic one and zero values are specified in the embodiments described above, these logic values actually will correspond to different voltages, as is well understood in the art. It is not critical how those voltages map to the corresponding logic values, provided that such mappings are performed in a consistent manner and the selected hardware is in conformity with such mappings.

Thus, although the present invention has been described in detail with regard to the exemplary embodiments and drawings thereof, it should be apparent to those skilled in the art, that various adaptations and modifications of the present embodiments may be accomplished without departing from the spirit and scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

What is claimed is:

1. An incrementing/decrementing apparatus comprising:
an adder having a first input and a second input, each of the first input and the second input comprising plural bits;
a first multi-bit signal connected to the first input; and
a second multi-bit signal connected to the second input, wherein the second multi-bit signal comprises plural bits, wherein said adder increments the first multi-bit signal by a quantity when an increment/decrement signal has a first value and decrements the first multi-bit signal by the quantity when the increment/decrement signal has a second value, and
wherein the plural bits of the second multi-bit signal have been specified by comparing bits of the quantity to corresponding bits of a two's complement of the quantity.

2. An apparatus according to claim 1, wherein the plural bits of the second multi-bit signal include at least one bit based solely on a corresponding bit in the quantity and at least one bit based solely on the increment/decrement signal.

3. An apparatus according to claim 2, wherein each of the at least one bits based solely on a corresponding bit in the quantity is identical to the corresponding bit in the quantity.

4. An apparatus according to claim 2, wherein each of the at least one bits based solely on the increment/decrement signal either is identical to the increment/decrement signal or is an inverse of the increment/decrement signal.

5. An apparatus according to claim 1, wherein each of the plural bits of the second multi-bit signal is either based solely on the corresponding bit in the quantity or based solely on the increment/decrement signal.

6. An apparatus according to claim 5, wherein each of the plural bits of the second multi-bit signal based solely on the increment/decrement signal is identical to the increment/decrement signal if the corresponding bit in the quantity is zero and is an inverse of the increment/decrement signal if the corresponding bit in the quantity is one.

7. An apparatus according to claim 5, wherein said adder also includes an input for a carry-in bit, and wherein the input for the carry-in bit is tied to zero.

8. An apparatus according to claim 1, wherein said adder also includes an input for a carry-in bit, and wherein the input for the carry-in bit is tied to zero.

9. An apparatus according to claim 1, wherein the quantity is a pre-determined number and each bit making up the quantity is tied either to 1 or to 0.

10. An apparatus according to claim 1, wherein comparing bits of the quantity to corresponding bits of a two's complement of the quantity has been performed by performing an exclusive-or operation on corresponding bits of the quantity and the two's complement of the quantity.

11. A method of determining bits for a multi-bit signal, said method comprising:
   (a) obtaining a quantity that includes multiple bits;
   (b) calculating a two's complement of the quantity; and
   (c) specifying a value for each bit position of a multi-bit signal based on a comparison of a corresponding bit position in the quantity to the corresponding bit position in the two's complement of the quantity.

12. A method according to claim 4, wherein the comparison in step (c) comprises application of an exclusive-or operation.

13. A method according to claim 4, wherein for each bit position, if a value of a bit at said each bit position in the quantity is identical to a value of a bit at said each bit position in the two's complement of the quantity, then the value of a bit at said each bit position in the multi-bit signal is assigned the value of the bit at said each bit position in the quantity.

14. A method according to claim 13, wherein for each bit position, if the value of the bit at said each bit position in the quantity is different than the value of the bit at said each bit position in the two's complement of the quantity, then the value of the bit at said each bit position in the multi-bit signal is assigned based on a second rule.

15. A method according to claim 14, wherein the second rule provides that the value of the bit at said each bit position in the multi-bit signal is set equal to a value of a specified one-bit signal if the value of the bit at said each bit position in the quantity is equal to a first logic value and is set equal to an inverse of the value of the specified one-bit signal if the value of the bit at said each bit position in the quantity is equal to a second logic value.

16. A method according to claim 15, further comprising a step of inputting the multi-bit signal into an adder, wherein the adder is included in an increment/decrement circuit in which a first multi-bit signal is incremented by the quantity when the one-bit signal has a first value and decrements the first multi-bit signal by the quantity when the one-bit signal has a second value.

17. An apparatus for determining bits for a multi-bit signal, said method apparatus comprising:
   (a) means for obtaining a quantity that includes multiple bits;
   (b) means for calculating a two's complement of the quantity; and
   (c) means for specifying each bit position of a multi-bit signal based on a comparison of a corresponding bit position in the quantity to the corresponding bit position in the two's complement of the quantity.

18. A computer-readable medium storing computer-executable process steps for determining bits for a multi-bit signal, said process steps comprising steps to:
   (a) obtain a quantity that includes multiple bits;
   (b) calculate a two's complement of the quantity; and
   (c) specify each bit position of a multi-bit signal based on a comparison of a corresponding bit position in the quantity to the corresponding bit position in the two's complement of the quantity.

* * * * *